Jan. 3, 1950

L. M. FOURMAN 2,493,397

MANURE LOADER

Filed July 30, 1945

INVENTOR
LESTER M. FOURMAN
BY *John D. McLeran*
ATTORNEY

Jan. 3, 1950 L. M. FOURMAN 2,493,397
MANURE LOADER
Filed July 30, 1945 3 Sheets-Sheet 2
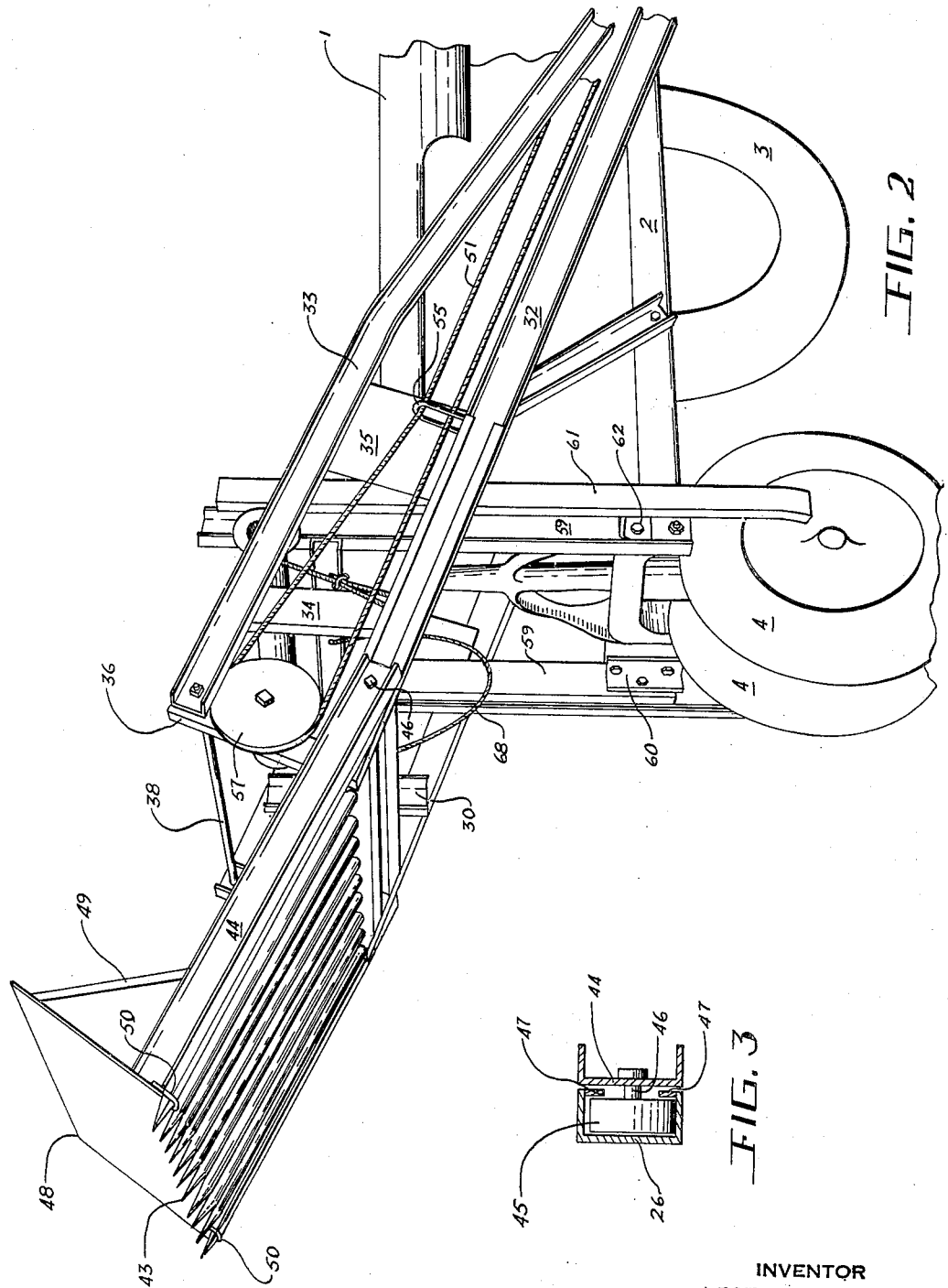
INVENTOR
LESTER M. FOURMAN
BY *John D. McLeran*
ATTORNEY Jan. 3, 1950        L. M. FOURMAN        2,493,397

MANURE LOADER

Filed July 30, 1945        3 Sheets-Sheet 3

INVENTOR
LESTER M. FOURMAN
BY *John D. McLeran*
ATTORNEY

Patented Jan. 3, 1950

2,493,397

UNITED STATES PATENT OFFICE 2,493,397

MANURE LOADER

Lester M. Fourman, Arcanum, Ohio

Application July 30, 1945, Serial No. 607,831

14 Claims. (Cl. 214—82)

This invention relates to manure loaders and has as one of its objects to provide a manure loader that may be attached to and readily removed from a tractor and be used in a minimum amount of vertical space. It is also an object of this invention to provide a manure loader in the form of a vertically swinging frame pivotally attached to a tractor and operated by the propelling mechanism of the tractor. It is also an object of this invention to provide a manure loader pivotally attached to a tractor and transported with the tractor and operated by a mechanism attached to and operated by the motor of the tractor. These and other purposes will appear from the following description, taken in connection with the drawings, in which:

Figure 2 is a view showing the front left-hand end of the manure loader with a part of the loader broken away and so much of the front part of the tractor shown as to disclose the relation between the loader and the tractor. In this figure the loader frame is in an elevated unloading position.

Figure 3 is a cross-section showing the relation between the loader frame and part of the dumping mechanism.

Figure 1:
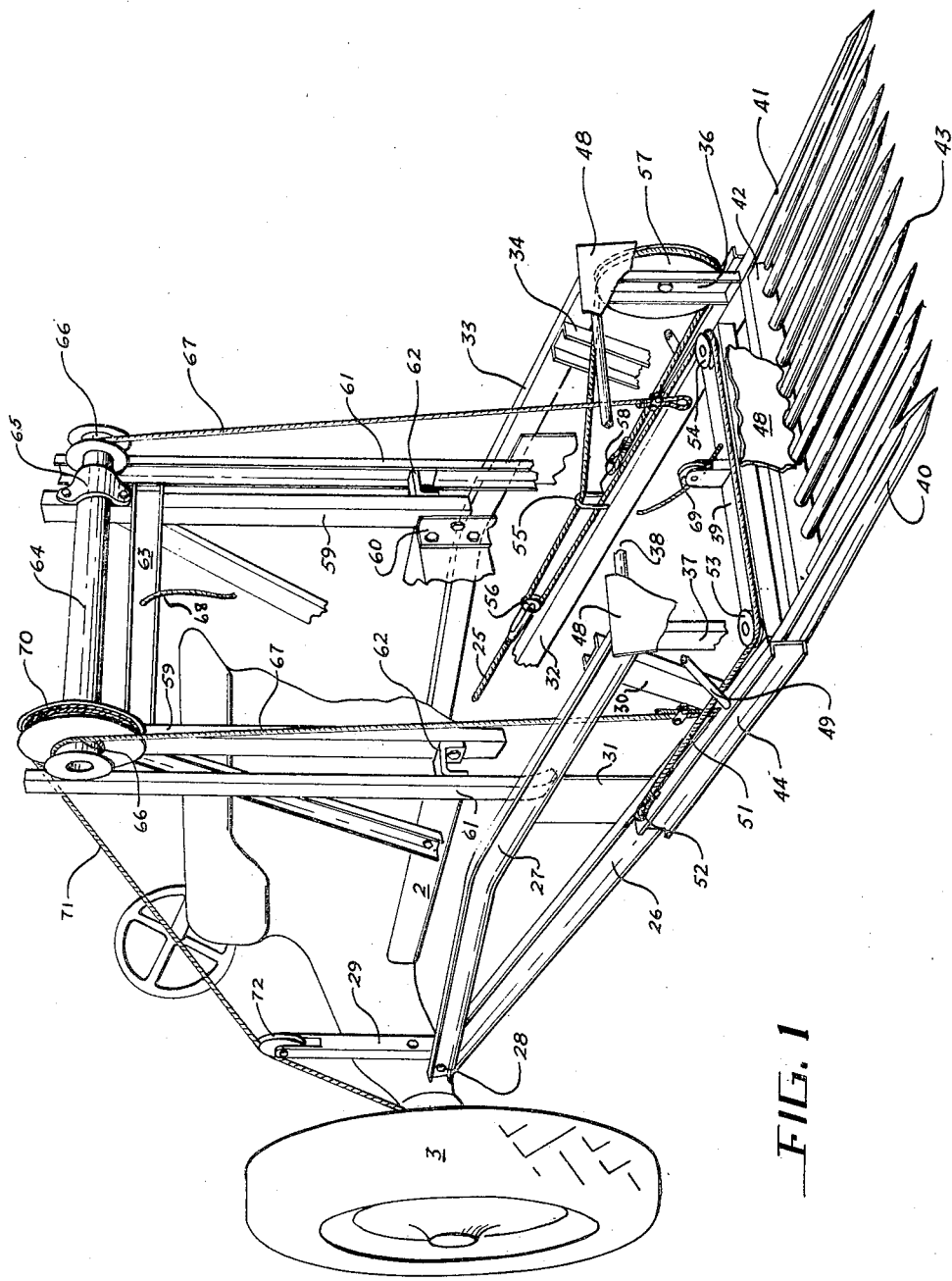
Figure 1 is a perspective view of the right-hand front of the manure loader with so much of the tractor shown as to show the relation between the tractor and manure loader. In this figure part of the manure loader is broken away to show part that would otherwise be concealed.

The tractor to which the manure loader is attached is indicated as a whole by the numeral 1, and has a frame 2 to which part of the manure loading mechanism is attached. The tractor has the usual rear wheels 3 for traction purposes, and the usual front wheels 4 for guiding purposes. The tractor also has the usual housing 5, in which the differential mechanism for driving the tractor is located. From this housing 5 and driven by the mechanism therein, is a power take-off shaft 6.

Figure 4:
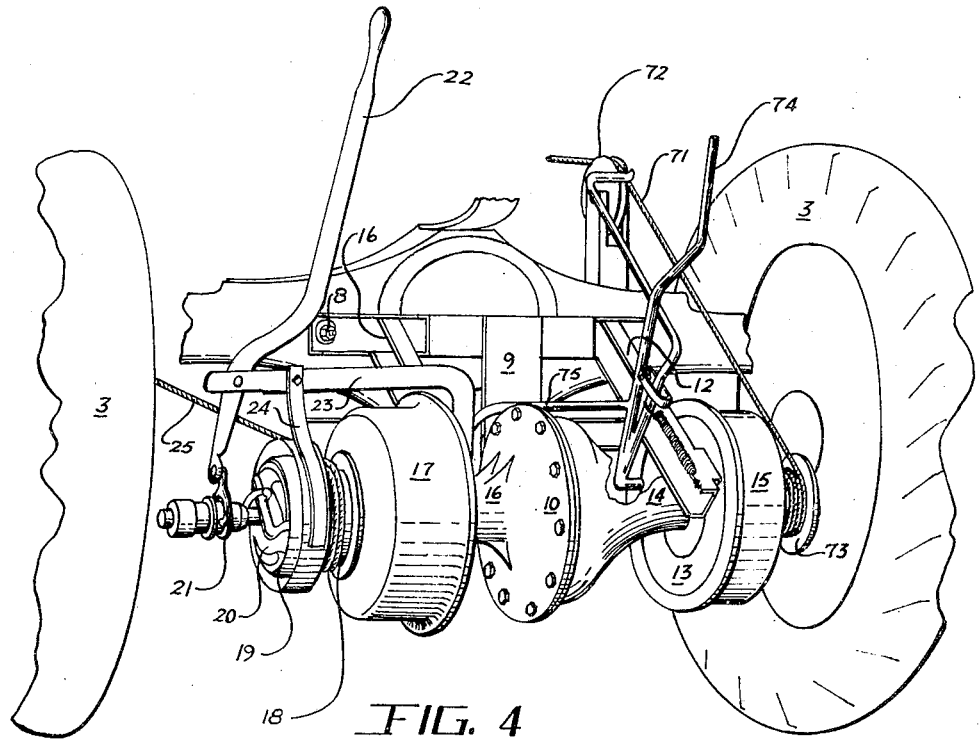
Figure 4 is a view showing the rear of the tractor with the loader operating mechanism attached thereto for elevating the loader and discharging the manure therefrom. Only so much of the tractor as is necessary to show the relation of this loader operating mechanism to the tractor is shown.

Attached to the rear of the tractor by means of bolts 8 is a frame 7. Attached to this frame in any suitable manner is a plate 9, to the lower end of which is attached the differential housing 10 of the loader operating mechanism, as shown in Figure 4.

The gears in the differential housing 10 are operated by means of a shaft 11 connected by a universal joint to the shaft 6 of the power take-off. The loader operating mechanism, as shown in Figure 4, is further supported on the frame 7 by means of braces 12 attached at one end to the frame 7 and at its other end to a round disc like member 13 forming part of the brake mechanism attached to an arm 14 of the differential housing.

Figure 5:
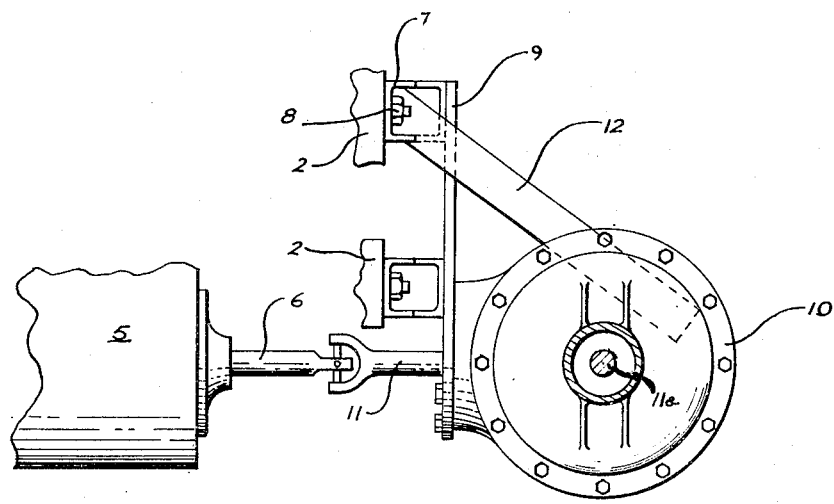
Figure 5 is a section through the loader operating mechanism showing the operative connection between the loader operating mechanism and the power of the tractor.

In the arm 14 of the differential housing there is a shaft similar to shaft 11a shown in Figure 5, which is attached to a brake drum 15 that has on its interior a brake mechanism operating to prevent the rotation of the drum. The differential housing has around the shaft 11a, an arm 16, similar to arm 14, to which is attached a disc, not shown, similar to disc 13, and to this disc there is also attached one end of one of the braces 12 for supporting this mechanism.

Attached to the shaft 11a for rotation therewith is a brake drum 17. Adjacent the brake drum 17, and loosely mounted upon the shaft 11a, is a cable drum 18, to which is attached one part of a friction clutch mechanism, designated by the numeral 19. The other part of this friction clutch mechanism, designated by the number 20, is attached to the shaft 11a and is operated by means of a clutch sleeve 21 mounted on the outer end of the shaft 11a.

These clutch parts are thrown into and out of operating connection by means of a lever 22 pivotally attached to a support arm or bar 23 supported on the differential housing. Extending from the arm 23 to the clutch mechanism for operating the drum 18 is an arm 24 used to support this mechanism. Around the drum 18 is a cable 25 which extends from the drum 18 to the movable pulley 56. It is through the drum 18, cable 25 and cable 51 that the push plate 48 is operated.

The manure loader is composed essentially of a frame. This frame has on its right side a beam 26, attached at its rear end to an arm 27 by means of a bolt 28, which serves as a pivotal support for the rear end of this part of the frame. This bolt passes through a support bar 29 suitably attached to some part of the rear of the tractor, such as the axle housing.

Near the front end of the beam 26 is a brace bar 30, attached at one end to the beam 26 and at the other end to the arm 27, slightly to the rear of the front ends of these members. Between the brace bar 30 and the pivoted bolt 28, there is a slide plate 31 attached to the beam 26 and the arm 27, by any suitable manner to provide for the easy swinging movement of the frame along guide members later described.

The left-hand side of the manure loader frame is similar in shape and construction to that on the right-hand side. In this part there is a beam 32 and an arm 33 similarly supported at their rear ends, as are the members 26 and 27. These members, the beam 32 and the arm 33, are connected adjacent their front ends by means of a brace bar 34. Between the brace bar 34 and the rear ends of the two members 32 and 33 is a slide plate 35, similar in construction and purpose to the slide plate 31. The ends of the members 32 and 33 are connected by means of an end member 36, and the ends of the member 26 and 27 are connected by means of an end member 37.

The front ends of the arms 27 and 33 are connected to each other by means of a rod 38 which passes through the upper ends of the members 36 and 37 and the front ends of the members 27 and 33. The front ends of the beams 26 and 32 are connected by means of a cross-plate 39. In front of this cross-plate 39 and attached directly to the ends of the beams is a cross-bar 42, to which is attached the rear end of a plurality of tines 43. On the right-hand side of the tines and continuous with the beam 26 is a prong 40; while on the left-hand side of the tines and continuous with the beam 32 is a prong 41.

In the operation of the loader, the tines and the prongs are inserted beneath the manure to be loaded. When the tines are thus inserted underneath the manure, the tines are free from obstruction and can be readily inserted under the manure. For the purpose of discharging the manure from the tines when the tines are in the elevated position, as shown in Figure 2, there is provided a dumping mechanism consisting of a pair of side bars 44, each having at its rear end a roller 45. These rollers travel in runways provided therefor in the beams 26 and 32, as illustrated in Figure 3. These beams may be provided with flanges 47 to prevent the rollers getting away from the beams. Each roller is supported by a shaft 46 suitably attached to a bar 44.

To the front ends of the side bars 44, there is attached in any suitable manner a push plate 48, supported by means of braces 49 attached to the plate and the side bars and held against the tines by means of loops 50 around the prongs 40 and 41. The push plate is operated by means of a cable 51 attached at one end 52 to the rear end of the slide bar 44 on the right-hand side of the loader. This cable passes around a pulley 53 on one end of the cross-plate 39 and around a second pulley 54 on the other end of the cross-plate 39. From the pully 54 the cable passes back through a guide loop 55, around a moveable pully 56, and forward through the guide loop 55, around a vertically supported pully 57, and back to the rear end of the slide bar 44 on the left-hand side of the frame. This cable is attached to the slide bar 44 at point 58. The pully 57 is supported on the end member 36.

Attached to the front end of the tractor are two up-right posts 59. These posts are attached to the tractor by means of brackets 60, and to each post, of which there are two, there is attached a guide bar 61, held in spaced relation to the post by means of a spacer member 62. The guide bars 61 are engaged by the slide plates 31 and 35 to guide and steady the frame as it moves up and down. Near the top of the posts 59 and the guide bars, there is a cross-bar 63, suitably attached to these members and holding them in rigid relation to one another. On the top of the posts and supported thereon by means of bearings 65 is a shaft 64, on each outer end of which is a pully or drum 66. To each drum is attached one end of a cable 67. The other ends of these cables are attached to the side beams 26 and 32. The drums 66 and the cables 67 are used to raise and lower the front end of the loader frame. For the purpose of automatically withdrawing the push plate 48 when the loader frame is being lowered, there is provided a cable 68, one end of which is attached to the push plate 48 and the other end to the cross bar 63. This cable passes under the pully 69 located on the cross-bar 39.

Attached to the pully 70 on the shaft 64 adjacent one of the drums 66 is one end of a rope or cable 71 adapted to be wound thereon by the downward movement of the frame, or unwound therefrom with the rotation of the shaft 64 through the rotation of a drum 73. This cable 71 passes over a guide pully 72 located on top of the support bar 29 and to the drum 73 to which the other end of the cable is attached.

Operation

For the purpose of loading manure the tractor with the loading frame in position shown in Figure 1 is advanced under the tractor power whereby the tines 43 are forced under a batch of manure which is desired to be loaded on a truck. The push-plate is in its rearward position at the rear ends of the tines.

After the manure is on the tines, the tines with the manure thereon are elevated. This is done through the rotation of the shaft 64 and the drums 66, which wind the ropes 67 up for that purpose. The shaft 64 is rotated by means of the pully 70 and cable 71, which is attached at one end to the drum 73. The drum 73, which is attached to the drum 15, is always rotating when the shaft in the part 14 of the differential housing is rotating.

Under normal conditions the drum 73 and the drum 15 are stationary due to the clutch action by the drum 15 and the member 13, and the drum 17 is rotating due to the connection between the gears in the differential housing 10, which are operatively connected to the power take-off by suitable clutch mechanism. In order to cause the drum 73 to rotate, a lever 74 is pushed forward so that the brake mechanism within the drum 15 is released so that the shaft and the drum 73 may rotate due to the rotation of the shaft 11. When this lever 74 is pushed forward, it, through the arm 75, causes a braking operation on the drum 17, whereby this drum ceases to rotate through the differential mechanism in the differential housing 10 causing the shaft on which the drum 73 is located to rotate. The rotation of the drum 73 elevates the load.

Whenever the manure is sufficiently elevated, the lever 74 is released so that it will move rearwardly by the spring 76. The drum 15 is locked against rotation about the disc 13. The manure is now ready to be moved to the vehicle on which it is to be loaded. With the lever 74 in its rear most position the drum 15 is locked against rotation while the drum 17 and the shaft 11a to which it is attached rotate.

When the manure is properly positioned in regard to the vehicle, the lever 22 is moved so that the clutch mechanisms 19 and 20 engage each other, thereby causing the drum 18 to rotate and take up cable 25 and move the push plate 48 forward through cables 51, whereby the manure is pushed off the tines. Whenever the manure is completely off the tines, the lever 74 is moved to such a position that the clutch mechanisms in drums 15 and 17 are not operating for clutching purposes. In this position the weight of the front end of the frame causes the cable 71 to be pulled forward and the drum 73 rotates in reverse to the hoisting operation. In this operation the cable 68 causes the push-plate to move backward to the rear ends of the tines. During the downward movement of the frame, the drum 73 rotates to let off the cable 71 and at the same time the drum 18 is caused to rotate in the opposite direction to take up the slack in the cable 25 connected to the push board.

What I claim is:

1. In a manure loader in combination with a tractor, a frame attached to the tractor, said frame having thereon manure receiving tines, means to raise and lower the frame and the tines a push board moveable longitudinally of the tines for discharging manure therefrom and means operated by the lowering of the frame to withdraw said push board after discharging the manure.

2. In a manure loader in combination with a tractor, a frame pivoted at one end to the tractor and having a plurality of tines at its other end to receive manure, means to swing the tined end of the frame upward, means to push the manure off the tines and means operated with a downward swing of the frame to withdraw the manure-pushing means back.

3. In a manure loader in combination with a tractor, a frame pivoted at one end to the tractor, tines on the other end of the frame to be inserted under manure for elevating it, means to elevate the tined end of the frame, means to push the manure off the tines after the frame has been elevated, and means operated by the downward movement of the frame to withdraw the push means.

4. In a manure loader in combination with a tractor, a frame pivoted at its rear end to the rear end of the tractor, means on the front end of the tractor to guide the frame in its swinging movement up and down, tines on the front end of the frame to be inserted into a pile of manure to lift the manure, a push board to push the manure off the tines when the frame is elevated and means operated by the lowering of the frame to withdraw the push board.

5. In a manure loader in combination with a tractor, a frame pivoted at its rear end to the rear end of the tractor for up and down movement, a guide frame attached to the front end of the tractor for guiding the frame as it moves up and down, a plurality of tines on the front end of the frame adapted to receive manure, a push board on said tines normally at the rear end of the tines, means to move the push board forward to force the manure from the tines.

6. In a manure loader in combination with a tractor, a frame pivoted at its rear end to the rear end of the tractor for up and down movement, a guide frame attached to the front end of the tractor for guiding the frame as it moves up and down, a plurality of tines on the front end of the frame adapted to receive manure, a push board on said tines normally at the rear end of the tines, means to move the push board forward to force the manure from the tines, and means actuated by the downward movement of the frame first named to withdraw the push board from a forward to a rear position automatically as the front of the frame is lowered.

7. In a manure loader in combination with a tractor, means for picking up and hoisting a batch of manure, means for discharging the manure from the first named means, power take-off means operatively connected to the tractor, a drum operatively connected to the power take-off means for operating the first named means, a drum operatively connected to the power take-off means and operating the second named means, and a lever operatively connected to the power take-off means for selectively operating the drums.

8. In a manure loader in combination with a tractor, means for picking up and hoisting a batch of manure, means for discharging the manure from the first named means, power take-off means operatively connected to the tractor, a drum operatively connected to the power take-off means for operating the first named means, a drum operatively connected to the power take-off means and operating the second named means, and means operatively connected to the drums and the power take-off means to operate the drums in unison or one at a time.

9. In a manure loader in combination with a tractor, means for picking up and hoisting a batch of manure, means for discharging the manure from the first named means, power take-off means operatively connected to the tractor, a drum operatively connected to the power take-off means for operating the first named means, a drum operatively connected to the power take-off means and operating the second named means, and means operatively connected to the drums and the power take-off means to operate the drums in unison or one at a time, said last named means comprising a lever and a pair of brake mechanisms operated by the lever.

10. In a manure loader, in combination with a tractor, a frame pivoted at one end to the tractor and having on its other end manure carrying facilities, push means to push the manure off the said facilities, a post mounted on said tractor, a pulley on said other end of said frame and a cable attached at one end to the post and at its other end to said push means, said cable passing beneath said pulley, said pulley acting on said cable to hold the push means to the rear end of said manure carrying facilities when said frame is in one position.

11. In a manure loader, in combination with a tractor, a frame pivoted at one end to the tractor and having on its other end manure carrying facilities and a pulley, push means to push the manure off the said facilities, a post mounted on said tractor, means to raise and lower said frame and a cable attached at one end to the post and at its other end to said push means, said cable passing beneath the pulley, said pulley acting on said cable to pull the push means backwards when the frame is moved to a lower position.

12. In a manure loader, in combination with a tractor, a frame pivoted at its rear end to the tractor and having on its front manure carrying facilities and a pulley, push means on said facilities to push the manure off the said facilities, means to move said facilities for pushing the manure therefrom, a post mounted on said tractor, a cable attached at one end to said post and at its other end to said push means, said cable passing beneath the pulley and cooperating with the pulley to move the push means backwards from a manure discharging position when the frame is lowered.

13. In a manure loader, in combination with a tractor, a manure hoisting means pivoted to said tractor, means to discharge the manure from hoisting means, a drum and cable for operating said hoisting means, a drum and cable for operating the means for discharging the manure, a drive mechanism and a lever operable to connect the drive mechanism to cause the drive mechanism to operate either one of said pulleys separately or together.

14. In a manure loader, in combination with a tractor, a differential gear mechanism attached to said tractor and operated by said tractor, a pair of shafts connected to said differential gear mechanism, a drum and cable on each shaft, a load hoisting means operated by one drum and cable, a load discharge means operated by the other drum and cable, and a lever operable to cause one drum and shaft to rotate while the other one is not rotating or to cause both drums and shafts to rotate at the same time.

LESTER M. FOURMAN.

REFERENCES CITED

The following references are of record in the file of this patent:

UNITED STATES PATENTS

| Number | Name | Date |
|---|---|---|
| 1,610,393 | Taylor | Dec. 14, 1926 |
| 1,941,945 | Landrin | Jan. 2, 1934 |
| 2,106,402 | Carlesimo | Jan. 25, 1938 |
| 2,246,083 | Weber | June 17, 1941 |
| 2,301,832 | Towson et al. | Nov. 10, 1942 |
| 2,306,474 | Tieslau | Dec. 29, 1942 |
| 2,311,523 | Cope et al. | Feb. 16, 1942 |
| 2,327,473 | Wagner et al. | Aug. 24, 1943 |
| 2,397,045 | Richey | Mar. 19, 1946 |
| 2,404,154 | Williams | July 16, 1946 |